United States Patent

Chodnekar et al.

[11] 3,829,577
[45] Aug. 13, 1974

[54] METHYLENEDIOXY-PHENOXY DERIVATIVES AS AGENTS FOR UPSETTING HORMONE BALANCE IN INSECTS

[75] Inventors: Madhukar Subraya Chodnekar, Basel; Albert Pfiffner, Pfaffhausen; Norbert Rigassi, Arlesheim; Ulrich Schwieter, Reinach; Milos Suchy, Basel, all of Switzerland

[73] Assignee: Hoffman-La Roche Inc., Nutley, N.J.

[22] Filed: Apr. 24, 1972

[21] Appl. No.: 247,083

Related U.S. Application Data

[62] Division of Ser. No. 123,105, March 10, 1971, Pat. No. 3,686,222.

[30] Foreign Application Priority Data

Mar. 25, 1970  Switzerland.......................... 4620/70

[52] U.S. Cl........... 424/278, 424/DIG. 12, 424/282, 260/340.5
[51] Int. Cl............................................. A01n 9/28
[58] Field of Search.............. 424/282, DIG. 12, 278

[56] References Cited
UNITED STATES PATENTS

| 3,563,982 | 2/1971 | Bowers | 260/340.5 |
| 3,637,752 | 1/1972 | Siddall | 424/282 |

OTHER PUBLICATIONS

Borkovec, A., "Insect Chemosterilants," Vol. VII (1966), pp. 61–63.
Bowers, "Science," Vol. 164 (3877), 1969, pp. 323–325.

*Primary Examiner*—Vincent D. Turner
*Attorney, Agent, or Firm*—Samuel L. Welt; Jon S. Saxe; William H. Epstein

[57] ABSTRACT

Methylenedioxy substituted benzyloxy or phenyloxy ethers of aliphatic hydrocarbons, wherein the aliphatic group contains between 6 and 11 carbon atoms. These ethers are useful in killing and preventing the proliferation of insects by upsetting their hormonal balance.

4 Claims, No Drawings

METHYLENEDIOXY-PHENOXY DERIVATIVES AS AGENTS FOR UPSETTING HORMONE BALANCE IN INSECTS

This is a division, of application Ser. No. 123,105 filed Mar. 10, 1971 entitled Methylenedioxy-Phenoxy Derivatives now U.S. Pat. No. 3,686,222.

SUMMARY OF THE INVENTION

In accordance with this invention, it has been found that compounds of the formula:

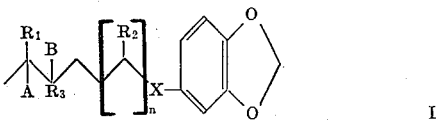

I wherein $R_1$ and $R_2$ are methyl or ethyl, $R_3$ is hydrogen or methyl, A and B individually are hydrogen or A and B taken together are a carbon to carbon bond or an oxygen bridge, X is oxygen or $-O-CH_2-$ and $n$ is an integer of from 0 to 1;
upset the hormone balance of pests such as insects to prevent them from growing and reproducing.

The compounds of formula I are prepared by reacting a compound of the formula:

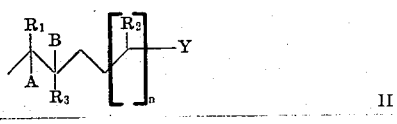

II wherein $R_1$, $R_2$, $R_3$, A, B and $n$ are as above and Y is a halogen;
with a compound of the formula:

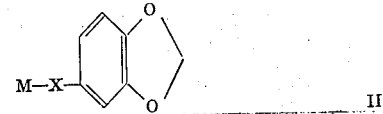

III wherein X is as above and M is an alkali metal.

In the case wherein A and B of the compound of formula I taken together are a carbon to carbon bond, the double bond formed thereby can be hydrogenated or epoxidized. When hydrogenated, a compound of formula I is obtained wherein A and B individually are hydrogen, and when epoxidized, a compound of formula I is obtained wherein A and B taken together are an oxygen bridge.

DETAILED DESCRIPTION OF THE INVENTION

As used throughout this application, the term "halogen" or "halo," when not expressly stated otherwise, includes all four halogens, i.e., fluorine, chlorine, bromine and iodine. As also used herein, the term "alkali metal" includes the metals of the first main group of the periodic chart, e.g., lithium, sodium and potassium.

The compounds of formula I are suitable for combatting pests. In contrast to most of the known pesticides which kill, cripple or drive away the pests, such as contact-poisons and feed-poisons, the compounds of formula I interfere with the hormonal system of the pest organism. In insects, for example, the transformation to the imago, the laying of viable eggs and the development of laid normal eggs is disturbed. The sequence of generations is interrupted and the animals are indirectly killed. The compounds of formula I are also practically non-poisonous to vertebrate animals, the toxicity of these compounds being over 1,000 mg/kg body weight. Furthermore, these new compounds are readily degraded. The risk of accumulation is therefore excluded. Therefore, these compounds can be unhesitatingly employed for combatting pests in animals, plants and provisions.

The compounds of formula I are especially suitable for combatting invertebrate animals such as arthropods and nematodes. These compounds are especially useful against insects such as Tenebrio molitor (yellow meal worm), flies, potato beetles, Prodenia, Dysdercus, Ephestia kuhniella (flour moth), aphids or spider-mites. In general, applying a concentration of the compound of formula I as the active substance of from about $10^{-3}$ to $10^{-6}$g/cm$^2$ of the material to be protected, i.e., foodstuffs, feeds, textiles, plants etc., suffices to ensure the desired effect.

Generally, it is preferred to utilize the active substance in a composition with a suitable inert carrier. Any conventional inert carrier can be used.

The compounds of formula I can, for example, be employed in the form of emulsions, suspensions, dusting agents, solutions or aerosols. Such pesticides contain the compound of formula I in concentrations of from about 0.01 percent to about 0.5 percent and preferably about 0.1 percent. In particular cases, the goods which are to be protected (e.g., foodstuffs, seeds, textiles) can also be directly impregnated with the active substance concerned or with a solution of the active substance. The active substance can furthermore also be applied in a form which releases the active substance only by the action of external influences (e.g., in contact with moisture) or only in the animal body itself.

The compounds of formula I above can be used as solutions suitable for spraying on the material to be protected, which solutions can be prepared by dissolving or dispersing these compounds in a solvent such as mineral oil fractions; cold tar oils; oils of vegetable or animal origins; hydrocarbons such as napthalenes; ketones such as methyl ethyl ketone; or chlorinated hydrocarbons such as tetrachloroethylene, tetrachlorobenzene, and the like. The compounds of formula I above can also be prepared in forms suitable for dilution with water to form aqueous liquids such as, for example, emulsion concentrates, pastes or powders. The compounds of formula I above can be combined with solid carriers for making, dusting or strewing powders, for example, talc, kaolin, bentonite, calcium carbonate, calcium phosphate, etc. The compositions containing the compounds of formula I above can contain, if desired, emulsifiers, dispersing agents, wetting agents, or other active substances such as fungicides, bacteriacides, nematocides, fertilizers and the like. The materials which are to be protected act as bait for the insect. In this manner, the insect, by contacting the material impregnated with a compound of formula I above, also contacts the compound itself.

In accordance with this invention, the preferred compounds of formula I are as follows:
the compounds of the formula:

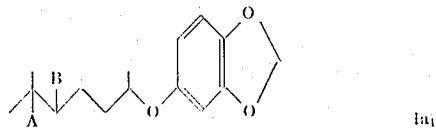

Ia wherein A and B are as above;
especially:
2-methyl-6-[(3,4-methylenedioxy)-phenoxy]-hept-2-ene;
2-methyl-6-[(3,4-methylenedioxy)-phenoxy]-heptane; and
2,3-epoxy-2-methyl-6-[(3,4-methylenedioxy)-phenoxy]-heptane;
the compounds of the formula:

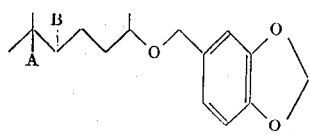
Ia₂ wherein A and B are as above;
especially: 2-methyl-6-[(3,4-methylenedioxy)-benzyloxy]-heptane;
the compounds of the formula:

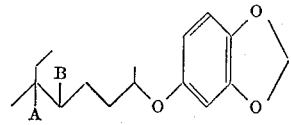
Ib wherein A and B are as above;
especially:
3-methyl-7-[(3,4-methylenedioxy)-phenoxy]-oct-3-ene;
6-methyl-2-[(3,4-methylenedioxy)-phenoxy]-octane; and
5,6-epoxy-6-methyl-2-[(3,4-methylenedioxy)-phenoxy]-octane;
the compounds of the formula:

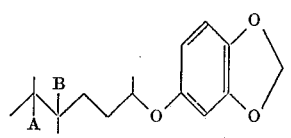
Ic wherein A and B are as above;
especially:
2,3-dimethyl-6-[(3,4-methylenedioxy)-phenoxy]-hept-2-ene;
2,3-epoxy-2,3-dimethyl-6-[(3,4-methylenedioxy)-phenoxy]-heptane; and
2,3-dimethyl-6-[(3,4-methylenedioxy)-phenoxy]-heptane;
the compounds of the formula:

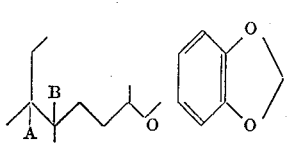
Id wherein A and B are as above;
the compounds of the formula:

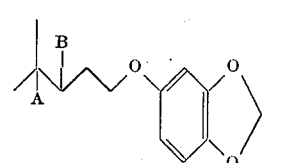
Ie wherein A and B are as above;
the compounds of the formula:

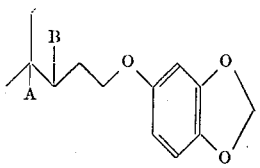
If wherein A and B are as above;
especially:
4-methyl-1-[(3,4-methylenedioxy)-phenoxy]-hex-3-ene;
4-methyl-1-[(3,4-methylenedioxy)-phenoxy]-hexane; and
3,4-epoxy-4-methyl-1-[(3,4-methylenedioxy)-phenoxy]-hexane;
the compounds of the formula:

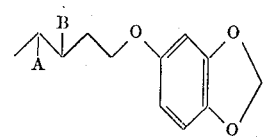
Ig wherein A and B are as above;
the compounds of the formula:

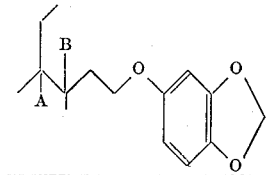
Ih wherein A and B are as above and
the compounds of the formula:

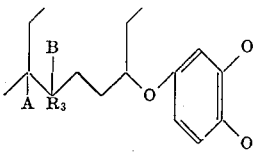
Ii wherein $R_3$, A and B are as above;
especially:
7-Methyl-3-[(3,4-methylenedioxy)-phenoxy]-nonane;
3-Methyl-7-ethyl-[(3,4-methylenedioxy)-phenoxy]-oct-3-ene;
6,7-Epoxy-7-methyl-3-[(3,4-methylenedioxy)-phenoxy]-nonane; and
6,7-Epoxy-6,7-dimethyl-3-[(3,4-methylenedioxy)-phenoxy]-nonane.

The compounds of formula I are expediently obtained by reacting a halide of formula II with an alkali metal salt of formula III. The compounds of formula II and III are known compounds which are reacted together in a well known manner to form the compounds of formula I. In preparing the compounds of formula I, the alkali metal salt of formula III, formed in situ is first suspended in an inert organic solvent, and then, the halide of formula II is added thereto. Any of the halides of the compounds of formula II can be used to form the compound of formula I with the chlorides and bromides being the preferred halides. In carrying out this reaction, any conventional inert organic solvent can be used.

The alkali metal salt of formula III can be suitably obtained by the reaction between a corresponding phenol or benzyl alcohol and an alkali metal base. Although any alkali metal base can be used, the alkali metal hydrides, alkali metal alkanolates and the alkali metal hydroxides are the preferred bases and sodium is the corresponding, preferred alkali metal.

The formation of the alkali metal salt of formula III is suitably carried out in the presence of an inert organic solvent. This reaction can be conveniently carried out in the same inert organic solvent used in the reaction between the compounds of formulas II and III. Although the selection of the inert organic solvent for these reactions is not critical, when an alkali metal hydride is used to prepare the compound of formula III, the preferred solvents are dioxane, tetrahydrofuran, dimethylformamide, and diethyl ether; when an alkali metal alkanolate is used, the preferred solvents are the corresponding alkanols (e.g. sodium methylate in methanol); and when an alkali metal hydroxide is used, the preferred solvents are the alkanols, particularly ethanol and methanol.

Another means of reacting the halide of formula II with the alkali metal salt of formula III, to form the compound of formula I, is by carrying out this reaction in the presence of a phenol and an alkali metal carbonate. In carrying out this reaction, any conventional inert solvent can be utilized, with acetone being the preferred solvent. Also, in carrying out this reaction, any alkali metal carbonate can be used, potassium carbonate being the preferred carbonate.

In carrying out the above reactions between the compounds of formula II and III, temperature and pressure are not critical, and the reactions can be suitably conducted in a temperature range lying between 0°C. and the boiling temperature of the reaction mixture. Preferably, the reactions are also conducted in the presence of an aprotic solvent such as hexamethyl phosphoric acid triamide. The reaction mixture can then be worked up in a conventional manner by being heated under reflux, cooled, poured onto ice and extracted with diethyl ether. The ether extract can then be washed with water, dried and evaporated. The residual compound of formula I can then be further purified by distillation or adsorption, preferably on Kieselgel or aluminum oxide.

The compounds of formula I wherein A and B taken together are a carbon to carbon bond can, if desired, be hydrogenated or epoxidized in a manner known per se.

The hydrogenation of unsaturated compounds of formula I can be carried out by conventional hydrogenation means such as by hydrogenating in the presence of a conventional hydrogenation catalyst. In carrying out this reaction, temperature and pressure are not critical, a temperature range between about 25°C. and the boiling temperature of the solvent used and atmospheric or elevated pressures being preferred. Suitable as hydrogenation catalyst are, for example, Raney-nickel or preferably the noble metals, with palladium and platinum being especially preferred. Suitable as solvents are acetic acid ethyl ester and alkanols such as methanol and ethanol.

The compounds of formula I wherein A and B taken together are a carbon to carbon bond can be converted into a compound of formula I wherein A and B taken together are an oxygen bridge by any conventional epoxidation technique. The epoxidation of unsaturated compounds of formula I can be expediently carried out by treating the compound of formula I with an organic peracid. This reaction is carried out by first dissolving the compounds in an inert solvent. In carrying out this reaction, any inert organic solvent can be used, the halogenated hydrocarbons being preferred with methylene chloride and chloroform being especially preferred. To the solution is added an organic peracid. In carrying out this reaction, any conventional organic peracid can be utilized, perbenzoic acid, peracetic acid, m-chloroperbenzoic acid, and perphthalic acid being preferred. Although temperature and pressure are not critical to this reaction, the preferred temperature range lies between about 0°C. and about 25°C.

The epoxidation of unsaturated compounds of formula I can also be carried out by first treating the unsaturated compound of formula I with N-bromosuccinimide and water to give a bromohydrin of the formula:

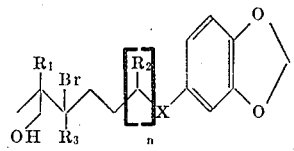

IV wherein $R_1$, $R_2$, $R_3$, $n$ and X are as above. In this reaction, temperature and pressure are not critical, the reaction being preferably carried out between 0°C. and 25°C. In carrying out this reaction, the unsaturated compound of formula I is preferably initially suspended in water. Then an inert organic solvent is added to the suspension to give a homogeneous concentrated solution of the compound of formula I in water and organic solvent. Any conventional inert organic solvent can be utilized in this reaction, dioxane, tetrahydrofuran and 1,2-dimethoxyethane being preferred. N-bromosuccinimide is then introduced portionwise into this homogeneous solution to yield the bromohydrin of formula IV.

These bromohydrins can then be converted by the action of a base to the corresponding epoxide. In carrying out this reaction, any conventional base is suitable, with the alkali metal alkanolates being preferred, especially sodium methylate in methanol. In this reaction, temperature and pressure are not critical, the reaction being preferably carried out between 0°C. and 25°C. Any conventional inert organic solvent can be utilized in this reaction, dioxane tetrahydrofuran and 1,2-dimethoxymethane being preferred.

In the species of the compounds of formula I wherein the side-chain is unsaturated or epoxidized, these species exist as a cis/trans isomer mixture. The isomer mixture can be separated in a conventional manner by, for example, fractional distillation or gas chromatography. The halides of formula II, wherein the chain, is epoxidized or unsaturated can exist as a mixture of cis and trans isomers. This isomeric mixture can, if desired, be separated into the all cis and all trans isomers in a conventional manner by, for example, fractional distillation.

The following examples illustrate the invention. All temperatures are stated in degrees centigrade.

EXAMPLE 1

4.8 g of a 50 percent by weight suspension of sodium hydride in mineral oil was washed twice with hexane in an inert gas atmosphere, then added to 40 ml of absolute tetrahydrofuran. With ice-cooling and stirring, a solution of 13.8 g of 3,4-methylenedioxy-phenol in 80 ml of absolute tetrahydrofuran was added dropwise to the sodium hydride-tetrahydrofuran mixture. The resulting mixture was further stirred at room temperature for 1 hour. Subsequently 23 g of 2-bromo-6-methylhept-5-ene and, thereafter, with ice-cooling, 40 ml of hexamethyl phosphoric acid triamide were added dropwise. The reaction mixture was heated under reflux for 2 hours, then cooled, poured onto ice-cold, 1-N-hydrochloric acid and exhaustively extracted with diethyl ether. The ether extract was washed with saturated aqueous sodium chloride solution, dried over sodium sulphate and evaporated under reduced pressure. The residual oily 2-methyl-6-[(3,4-methylenedioxy)-phenoxy]-hept-2-ene was purified by adsorption on Kieselgel with hexane and diethyl ether (4:1 parts by volume). B.P. 97°–99°C/0.04 mmHg; $n_D^{20}$ = 1.5200.

EXAMPLE 2

By utilizing the procedure of Example 1, 2-bromo-6-methyl-oct-5-ene and 3,4-methylenedioxy-phenol were converted into 3-methyl-7-[(3,4-methylenedioxy)-phenoxy]-oct-3-ene. B.P. 108°–110°C/0.1 mmHg; $n_D^{20}$ = 1.5182.

EXAMPLE 3

By utilizing the procedure of Example 1, 1-bromo-4-methyl-hex-3-ene and 3,4-methylenedioxy-phenol were converted into 4-methyl-1-[(3,4-methylenedioxy)-phenoxy]-hex-3-ene. B.P. 90°C/0.001 mmHg (bulb-tube distillation); $n_D^{20}$ = 1.5286.

EXAMPLE 4

By utilizing the procedure of Example 1, 1-bromo-3,4-epoxy-4-methyl-hexane and 3,4-methylenedioxy-phenol were converted into 3,4-epoxy-4-methyl-[(3,4-methylenedioxy)-phenoxy]-hexane. B.P. 100°C/0.001 mmHg (bulb-tube distillation); $n_D^{20}$ = 1.5222.

EXAMPLE 5

9.4 g of a 50 percent by weight suspension of sodium hydride in mineral oil was washed twice with hexane in an inert gas atmosphere, and then added to 100 ml of absolute dimethylformamide. With ice-cooling and stirring, a solution of 30 g of piperonyl alcohol in 100 ml of absolute dimethylformamide was added dropwise to the sodium hydride-dimethylformamide mixture. The resulting mixture was further stirred at room temperature for 1 hour. 40 g of 2-bromo-6-methyl-heptane was subsequently added dropwise. Then, the reaction mixture was heated to 70°C. for 2 hours, then cooled, poured onto ice-water and exhaustively extracted with diethyl ether. The ether extract was washed with saturated, aqueous sodium chloride solution dried over sodium sulphate and evaporated under reduced pressure. The residual oily 2-methyl-6-[(3,4-methylenedioxy)-benzyloxy]-heptane was purified by adsorption on Kieselgel with hexane and diethyl ether (4:1 parts by volume). B.P. 170°–172°C/1 mmHg.

EXAMPLE 6

3.1 g of 2-methyl-6-[(3,4-methylenedioxy)-phenoxy]-hept-2- ene was dissolved in 100 ml of acetic acid ethyl ester and hydrogenated at room temperature of about 25°C. and 1 atmosphere pressure in the presence of 0.5 g of platinum oxide. The hydrogenation was terminated after the uptake of 1 mol-equivalent of hydrogen. The catalyst was filtered off and the clear solution evaporated under reduced pressure. The residual 2-methyl-6-[(3,4-methylenedioxy)-phenoxy]-heptane was distilled in the bulb-tube. B.P. 100°C/0.001 mmHg; $n_D^{20}$ = 1.5004.

EXAMPLE 7

By utilizing the procedure of Example 6, 3-methyl-7-[(3,4-methylenedioxy)-phenoxy]-oct-3-ene was converted into 6-methyl-2-[(3,4-methylenedioxy)-phenoxy]-octane. B.P. 104°–105°C/0.09 mmHg; $n_D^{20}$ = 1.4994.

EXAMPLE 8

By utilizing the procedure of Example 6, 4-methyl-1-[(3,4-methylenedioxy)-phenoxy]-hex-3-ene was converted into 4-methyl-1-[(3,4-methylenedioxy)-phenoxy]-hexane. B.P. 100°C/0.001 mmHg (bulb-tube distillation); $n_D^{20}$ = 1.5057.

EXAMPLE 9

By utilizing the procedure of Example 6, 2,3-dimethyl-6-[(3,4-methylenedioxy)-phenoxy]-hept-2-ene was converted into 2,3-dimethyl-6-[(3,4-methylenedioxy)-phenoxy]-heptane. B.P. ca 120°C/.001 mmHg (bulb-tube distillation); $n_D^{20}$ = 1.4994.

EXAMPLE 10

6.2 g of 2-methyl-6-[(3,4-methylenedioxy)-phenoxy]-hept-2-ene was dissolved in 100 ml of methylene chloride. With ice-cooling and stirring, 5.4 g of 80 percent by weight m-chloroperbenzoic acid was added portionwise and the resulting mixture was further stirred for 2 hours. The reaction mixture was then diluted with 100 ml of methylene chloride and successively washed with ice-cold 1-N caustic soda and saturated, aqueous sodium chloride solution. The organic phase was separated off, dried over sodium sulphate and evaporated under reduced pressure. The residual 2,3-epoxy-2-methyl-6-[(3,4-methylenedioxy)-phenoxy]-heptane was purified by adsorption on Kieselgel with hexane and diethyl ether (4:1 parts by volume). B.P. 120°C/0.001 mmHg (bulb-tube distillation); $n_D^{20}$ = 1.5142.

EXAMPLE 11

By utilizing the procedure of Example 10, 3-Methyl-7-[(3,4-methylenedioxy)-phenoxy]-oct-3-ene was converted into 5,6-epoxy-6-methyl-2-[(3,4-methylenedioxy)-phenoxy]-octane. B.P. 120°C/0.001 mmHg (bulb-tube distillation); $n_D^{20}$ = 1.5120.

EXAMPLE 12

By utilizing the procedure of Example 10, 4-methyl-1-[(3,4-methylenedioxy)-phenoxy]-hex-3-ene was converted into 3,4-epoxy-4-methyl-1-[(3,4-methylenedioxy)-phenoxy]-hexane. B.P. 100°C/0.001 mmHg (bulb-tube distillation); $n_D^{20}$ = 1.5222.

EXAMPLE 13

By utilizing the procedure of Example 10, 2,3-dimethyl-6-[(3,4-methylenedioxy)-phenoxy]-hept-2-ene was converted into 2,3-epoxy-2,3-dimethyl-6-[(3,4-methylenedioxy)-phenoxy]-heptane. B.P. ca 130°C/.001 mmHg (bulb-tube distillation); $n_D^{20}$ = 1.5118.

EXAMPLE 14

To a solution of 13.8 g 3,4-en obtained. in 100 ml of anhydrous acetone were successively added 20.7 g potassium carbonate and 23.6 g 2-bromo-5,6-dimethyl-hept-5-ene, and the reaction mixture was heated and stirred for 96 hours under reflux. Subsequently, the reaction mixture was evaporated, poured onto water and extracted with diethyl ether. The ether extract was then washed with .1-N sodium hydroxide and saturated, aqueous sodium chloride solution, dried over sodium sulfate and evaporated. Through distillation under high vacuum was pure 2,3-dimethyl-6-[(3,4-methylenedioxy)-phenoxy]-hept-2-enobtained. B.P. 111°–112°C/.007 mmHg; $n_D^{20}$ = 1.5198.

The tests described in the following Examples were carried out with the following preferred active substances as representative examples of the utility of the methylenedioxy-phenyl derivatives of the instant invention:

A. 2,3-epoxy-2-methyl-6-[(3,4-methylenedioxy)-phenoxy]-heptane

B. 3-methyl-7-[(3,4-methylenedioxy)-phenoxy]-oct-3-ene;

C. 5,6-epoxy-6-methyl-2-[(3,4-methylenedioxy)-phenoxy]-octane;

D. 4-methyl-1-[(3,4-methylenedioxy)-phenoxy]-hex-3-ene;

E. 3,4-epoxy-4-methyl-1-[(3,4-methylenedioxy)-phenoxy]-hexane;

F. 4-methyl-1-[(3,4-methylenedioxy)-phenoxy]-hexane;

G. 2-methyl-6-[(3,4-methylenedioxy)-phenoxy]-hept-2-ene;

H. 2-methyl-6-[(3,4-methylenedioxy)-phenoxy]-heptane;

I. 6-methyl-2-[(3,4-methylenedioxy)-phenoxy]-octane; and

J. 2-methyl-6-[(3,4-methylenedioxy)-benzyloxy]-heptane.

EXAMPLE 15

A filter paper strip [90 cm²] was sprayed with an acetonic solution of an active substance of this invention. An untreated paper strip and a paper strip soaked only with acetone were utilized as controls. After drying the strips, 3–4 pairs of freshly moulted imagos of the cotton bug [Dysdercus cingulatus] were placed upon each strip. The development of the eggs which were laid daily by the imagos is as follows: 100 percent mortality of the eggs: No development of the embryos in the eggs laid on strips soaked with active substance.

| Active substance | Amount of active substance $10^{-x}$ g/cm² | No. of eggs | No. of larvae | Mortality % |
|---|---|---|---|---|
| A | $10^{-5}$ | 151 | — | 100 |
| B | $10^{-5}$ | 129 | — | 100 |
| C | $10^{-5}$ | 354 | 3 | 99 |
| D | $10^{-5}$ | 346 | — | 100 |
| E | $10^{-5}$ | 213 | 20 | 91 |
| F | $10^{-5}$ | 154 | — | 100 |
| Control with acetone | | 251 | 240 | 4 |
| Control without acetone | | 290 | 275 | 5 |

EXAMPLE 16

A disc of cotton material [10 cm²] was sprayed with an acetonic solution of an active substance of this invention. An untreated disc of material and a disc of material soaked only with acetone were utilized as controls. After drying the discs, 30–60 freshly laid eggs of the meal moth [Ephestia Kuhniella] were placed upon each disc. The disc was placed in a cage and held at 25°C. and 90 percent rel. humidity.

The development of eggs was registered over a few days. 100 percent mortality of the eggs: No development of the embryos in the eggs laid on discs of material soaked with active substance.

| Active substance | Amount of active substance $10^{-x}$ g/cm² | No. of eggs | No. of larvae | Mortality % |
|---|---|---|---|---|
| A | $10^{-4}$ | 20 | — | 100 |
|   | $10^{-5}$ | 26 | 21 | 23 |
|   | $10^{-6}$ | 46 | 36 | 22 |
| B | $10^{-4}$ | 76 | — | 100 |
|   | $10^{-5}$ | 35 | 1 | 97 |
|   | $10^{-6}$ | 50 | 39 | 22 |
| C | $10^{-4}$ | 65 | — | 100 |
|   | $10^{-5}$ | 29 | 21 | 28 |
|   | $10^{-6}$ | 25 | 17 | 32 |
| D | $10^{-4}$ | 37 | — | 100 |
|   | $10^{-5}$ | 38 | 16 | 58 |
|   | $10^{-6}$ | 39 | 31 | 20 |
| E | $10^{-4}$ | 41 | — | 100 |
|   | $10^{-5}$ | 31 | — | 100 |
|   | $10^{-6}$ | 35 | 24 | 31 |
| F | $10^{-4}$ | 35 | — | 100 |
|   | $10^{-5}$ | 35 | 10 | 71 |
|   | $10^{-6}$ | 34 | 22 | 35 |
| G | $10^{-4}$ | 40 | — | 100 |
|   | $10^{-5}$ | 31 | 23 | 26 |
|   | $10^{-6}$ | 16 | 13 | 19 |
| H | $10^{-4}$ | 62 | — | 100 |
|   | $10^{-5}$ | 47 | 44 | 6 |
|   | $10^{-6}$ | 78 | 75 | 4 |
| I | $10^{-4}$ | 98 | — | 100 |
|   | $10^{-5}$ | 49 | 28 | 43 |
|   | $10^{-6}$ | 39 | 32 | 18 |
| J | $10^{-4}$ | 49 | 3 | 94 |
|   | $10^{-5}$ | 31 | 26 | 16 |
|   | $10^{-6}$ | 28 | 25 | 11 |
| Control with acetone | | 38 | 38 | — |
| Control without acetone | | 42 | 39 | 7 |

We claim:

1. An insecticide composition, comprising an amount, effective for upsetting the hormonal balance of insects selected from the group consisting of Dysdercus cingulatus and Ephestia kuhniella, of a compound of the formula:

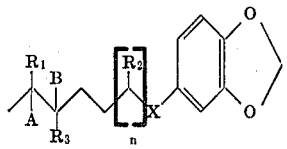

wherein $R_1$ and $R_2$ are methyl or ethyl, $R_3$ is hydrogen or methyl, A and B are individually hydrogen or A and B taken together are a carbon to carbon bond or an oxygen bridge, X is oxygen or —O—CH$_2$ and $n$ is an integer of from 0 to 1;
and an inert carrier.

2. The composition of claim 1 wherein said compound comprises between 0.01 and 0.5 percent of said composition.

3. The composition of claim 1 wherein said compound comprises 0.1 percent of said composition.

4. A method of controlling insects selected from the group consisting of Dysdercus cingulatus and Ephestia kuhniella, which comprises contacting said insects with an amount, effective for upsetting the hormonal balance of said insects, of a compound of the formula:

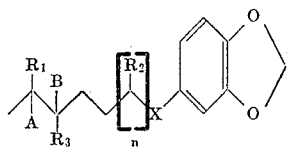
wherein $R_1$ and $R_2$ are methyl or ethyl, $R_3$ is hydrogen or methyl, A and B are individually hydrogen or A and B taken together are a carbon to carbon bond or an oxygen bridge, X is oxygen or —O—CH$_2$ and $n$ is an integer of from 0 to 1.
* * * * *